US006427912B1

(12) United States Patent
Levasseur

(10) Patent No.: US 6,427,912 B1
(45) Date of Patent: Aug. 6, 2002

(54) OFF-LINE CREDIT CARD TRANSACTION SYSTEM AND METHOD FOR VENDING MACHINES

(75) Inventor: Joseph L. Levasseur, St. Louis County, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 149 days.

(21) Appl. No.: 09/640,141

(22) Filed: Aug. 16, 2000

(51) Int. Cl.[7] .............................. G06K 5/00; G06F 7/08
(52) U.S. Cl. ...................................... 235/381; 235/380
(58) Field of Search ................................ 235/380, 382, 235/383, 375, 379, 381, 492, 493, 486, 487

(56) References Cited

U.S. PATENT DOCUMENTS

| | | | |
|---|---|---|---|
| 3,657,702 A | 4/1972 | Stephenson, Jr. | 340/149 R |
| 3,691,527 A | 9/1972 | Yamamoto | 340/149 A |
| 3,696,335 A | 10/1972 | Lemelson | 340/149 A |
| 3,727,186 A | 4/1973 | Stephenson, Jr. et al. | 340/149 A |
| 3,740,530 A | 6/1973 | Hoffer et al. | 235/61.7 B |
| 3,798,602 A | 3/1974 | Hynes, Jr. | 340/149 A |
| 3,818,187 A | 6/1974 | Lovendusky et al. | 235/61.7 B |
| 3,828,903 A | 8/1974 | Levasseur | 194/1 |
| 3,932,730 A | 1/1976 | Ambrosio | 235/61.9 R |
| 3,938,090 A | 2/1976 | Borison et al. | 340/149 A |
| 3,947,882 A | 3/1976 | Lightner | 360/92 |
| 3,982,103 A | 9/1976 | Goldman | 235/61.7 B |
| 4,120,452 A | 10/1978 | Kimura et al. | 235/381 |
| 4,187,498 A * | 2/1980 | Creekmore | 340/149 |
| 4,264,782 A | 4/1981 | Konheim | 178/22 |
| 4,412,292 A | 10/1983 | Sedam et al. | 364/479 |
| 4,472,626 A * | 9/1984 | Frid | 235/379 |
| 4,485,300 A | 11/1984 | Peirce | 253/380 |
| 4,558,211 A | 12/1985 | Berstein | 235/380 |
| 4,594,663 A | 6/1986 | Nagata et al. | 364/401 |
| 4,611,205 A | 9/1986 | Eglise | 340/825.35 |
| 4,650,977 A | 3/1987 | Couch | 235/379 |
| 4,675,515 A | 6/1987 | Lucero | 235/381 |
| 4,679,236 A | 7/1987 | Davies | 380/23 |
| 4,734,564 A | 3/1988 | Boston et al. | 235/380 |

(List continued on next page.)

FOREIGN PATENT DOCUMENTS

| | | | |
|---|---|---|---|
| GB | 2078410 A | * | 1/1982 |
| GB | 2328057 | | 10/1999 |
| WO | WO00/08610 | * | 2/2000 |

Primary Examiner—Thien M. Le
(74) Attorney, Agent, or Firm—Haverstock, Garrett & Roberts LLP

(57) ABSTRACT

A system and method for controlling off-line credit vend transactions are provided, including a vending system having a vend selection and delivery portion operable off-line, an associated credit card reader, and a transaction controller operatively connected to the card reader to receive information read from an inserted credit card and operatively connected to the vend selection and delivery portion to enable operation thereof. The system is operable, while off-line, to determine acceptability of an inserted card and the current availability at such system of off-line credit for an acceptable credit card, to enable operation of the vend selection and delivery portion if credit is authorized, and to be responsive to vend completion by the vend selection and delivery portion to store transaction information for the credit vend. The credit vend transaction information can later be downloaded and utilized for credit billing purposes. Information for use in determining credit transaction limitation counts and account numbers for preferred cards, and for determining higher credit transaction limitation counts for preferred cards, can be uploaded and stored in the system for use in determining card acceptability and the availability of off-line credit.

70 Claims, 10 Drawing Sheets

U.S. PATENT DOCUMENTS

| | | | |
|---|---|---|---|
| 4,795,890 A | | 1/1989 | Goldman .................... 235/380 |
| 4,812,628 A | | 3/1989 | Boston et al. .............. 235/380 |
| 4,822,985 A | | 4/1989 | Boggan et al. ............. 235/380 |
| 4,868,900 A | | 9/1989 | McGuire .................... 235/380 |
| 4,870,259 A | | 9/1989 | Boggan et al. ............. 235/380 |
| 4,874,932 A | | 10/1989 | Kimizu ....................... 235/379 |
| 4,891,503 A | | 1/1990 | Jewell ........................ 235/380 |
| 4,943,707 A | * | 7/1990 | Boggan ....................... 235/380 |
| 5,023,782 A | * | 6/1991 | Lutz et al. .................. 364/405 |
| 5,053,607 A | * | 10/1991 | Carlson et al. ............. 235/379 |
| 5,175,682 A | * | 12/1992 | Higashiyama et al. ...... 364/408 |
| 5,177,342 A | * | 1/1993 | Adams ....................... 235/379 |
| 5,201,010 A | * | 4/1993 | Deaton et al. ................. 382/7 |
| 5,231,569 A | * | 7/1993 | Myatt et al. ................ 364/408 |
| 5,231,570 A | | 7/1993 | Lee ........................... 364/408 |
| 5,285,382 A | | 2/1994 | Muehlberger et al. ...... 364/401 |
| 5,340,969 A | | 8/1994 | Cox ........................... 235/381 |
| 5,352,876 A | | 10/1994 | Watanabe et al. ........... 235/381 |
| 5,357,563 A | * | 10/1994 | Hamilton et al. ............. 379/91 |
| 5,384,449 A | * | 1/1995 | Peirce ........................ 235/380 |
| 5,457,306 A | | 10/1995 | Lucero ....................... 235/380 |
| 5,559,312 A | | 9/1996 | Lucero ....................... 235/380 |
| 5,679,940 A | * | 10/1997 | Templeton et al. .......... 235/380 |
| 5,726,937 A | | 3/1998 | Beard .................... 365/185.33 |
| 5,793,027 A | | 8/1998 | Baik .......................... 235/380 |
| 5,796,832 A | | 8/1998 | Kawan ......................... 380/24 |
| 5,806,045 A | * | 9/1998 | Biorge et al. ................. 705/14 |
| 5,844,218 A | | 12/1998 | Kawan e tal. .............. 235/380 |
| 5,952,640 A | | 9/1999 | Lucero ....................... 235/380 |
| 6,019,283 A | | 2/2000 | Lucero ....................... 235/380 |
| 6,032,859 A | | 3/2000 | Muehlberger et al. ...... 235/449 |
| 6,056,194 A | | 5/2000 | Kolls ......................... 235/381 |
| 6,119,934 A | | 9/2000 | Kolls ......................... 235/381 |

\* cited by examiner

TRANSACTION LIMITATION PARAMETERS

| | ACTIVITY LEVEL EXPECTED (DURING SHORT PERIOD) | | | PREVIOUS TRANSACTION TIME PERIOD (DURING LONGER PERIOD) |
|---|---|---|---|---|
| E.G. | AVERAGE ACTIVITY 6 AM - 11 AM 1 PM - 11 PM | HIGH ACTIVITY 11 AM - 1 PM | LOW ACTIVITY 11 PM - 6 AM | |
| STANDARD (OR FIRST TIME) CUSTOMER | 2 | 4 | 1 | 14 |
| PREFERRED (HISTORICALLY KNOWN GOOD) CUSTOMER | 4 | 8 | 2 | 24 |

Fig. 3

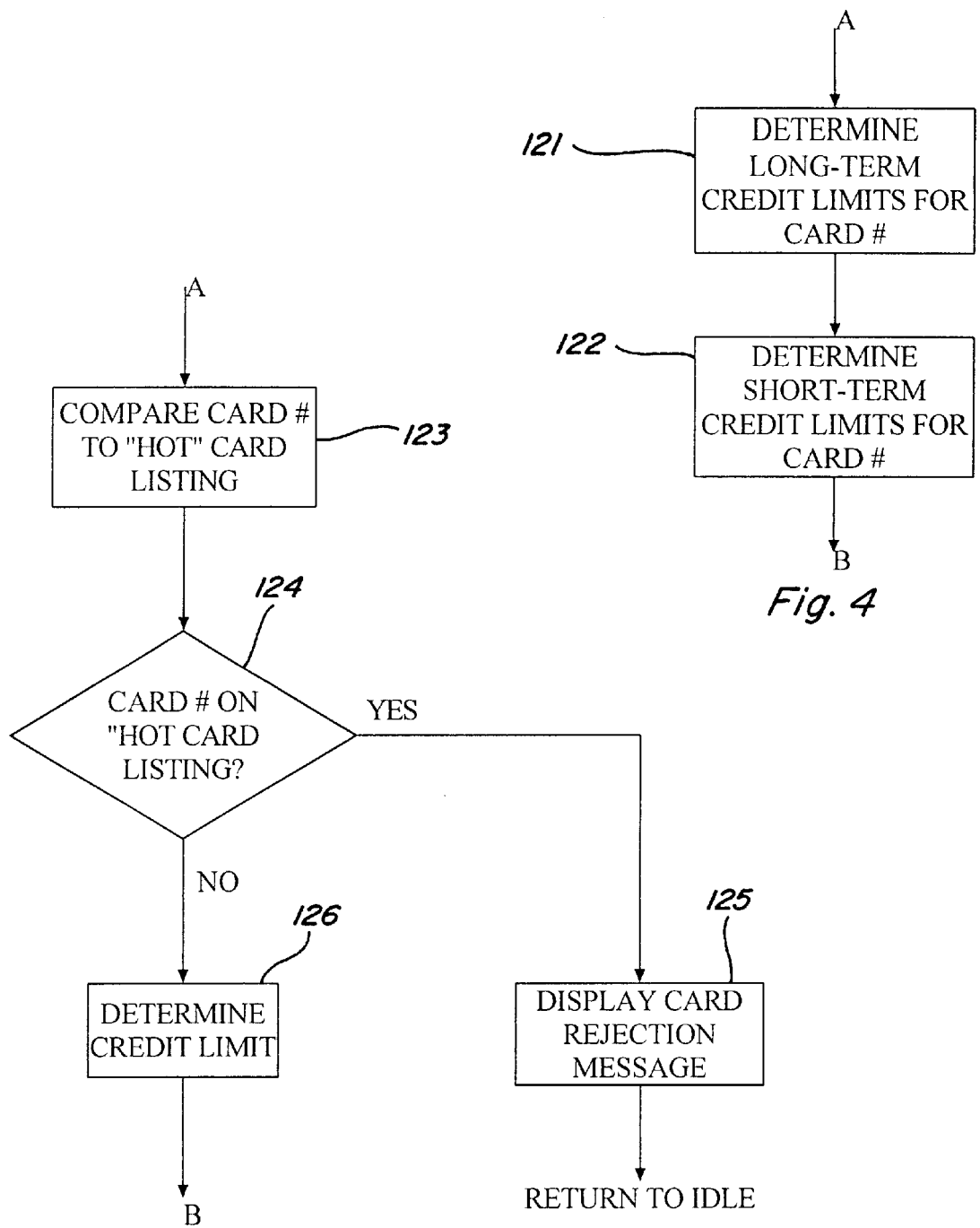

OFF-LINE CREDIT CARD TRANSACTION SYSTEM AND METHOD FOR VENDING MACHINES

BACKGROUND OF THE INVENTION

The present invention relates to systems and methods for processing credit card transactions at an off-line vending machine or vending system, and relates particularly to a remotely located and unattended point of sale location at which a vending machine is installed.

Vending operators have found it desirable to be able to install vending machines and systems at numerous locations for point of sale vending operations, including in remote locations and, in some instances, in locations that have proven susceptible to criminal activity, including burglary of monies inserted into the vending machine or system during vending operations. In light thereof, it would be beneficial to be able to vend a product based upon credit rather then upon inserted monies.

While the use of credit cards in certain vending situations, e.g. insertion of a credit card at a gasoline pump island at a multi-pump gasoline station, with ready access to phone and/or communications lines, and most sales of at least $10.00 or greater, has proven advantageous, it has not generally been considered economically or practically feasible to be able to employ credit cards for vending of products at prices often of $1.00 or less from individual vending machines, particularly from machines installed at remote locations without ready access to phone or other communication lines. In such regard, the cost of equipment and other costs to provide on-line communications to determine a credit card's validity and its credit status, to provide authorization, and to initiate funds collection for transactions can be prohibitive when the sale prices of products are all around one dollar. The time to complete an on-line transaction is also a problem when there are a number of transactions being made in a short or limited period of time.

At present there are many on-line credit card systems for authorizing credit card transactions, such as U.S. Pat. No. 4,558,211 to Berstein, wherein is shown the use of intermittent communications to periodically update local hot card files at the point of sale. Another approach is shown in U.S. Pat. No. 4,485,300 to Peirce, where on-line communications are required if certain parameters defined by the issuer are met. Another system, which reduces on-line communication, is described in U.S. Pat. No. 3,982,103, wherein the credit card has recorded thereon the aggregate value of transactions occurring at "off-line" terminals during a period of time. The terminals utilize the aggregate value to help determine if on-line communication is required. U.S. Pat. No. 4,812,628 by Boston discloses how the amount of the transaction can be compared to the risk assessment stored on the card for determining whether on-line communication is required.

Another on-line system and method for processing debit and credit cards is shown in U.S. Pat. No. 5,285,382 to Muehlberger, wherein transactions above a predetermined amount are communicated on-line at the time of the transaction, while transactions below the predetermined amount are accumulated for communication in a batch at a later time when communication rates are reduced. Such patent also teaches that on-line approved and rejected card account numbers can be stored for reference during a second predetermined time period so as to limit the next for on-line communications.

While such noted system may be worthwhile in various settings and circumstances, they do not address situations and circumstances where a vending machine or system is installed at a remote location without ready access to communications or data lines for on-line transactions. The present invention addresses such a situation and circumstances. In doing so, it is recognized that there is some risk involved in extending or authorizing any credit for a vend transaction without checking a user's credit on-line. The risk of loss from an improvident grant of credit may, however, often be less then the risk of loss from burglary of a vending machine's coin or currency deposits, and may also serve to deter vandalism or destruction of vending machines in some instances, such as when a person wreaks serious damage upon a machine just to obtain one or two soft drinks whose costs are, perhaps, a dollar or less a piece.

The system and method of the present invention are thus primarily directed to credit vending transactions under off-line conditions and in off-line situations, and provide a manner of retaining and exercising control with regard to, and over, credit vend transactions and the pattern of such transactions for a given credit card account number, and may include limitations on the authorization of credit for a vend transaction at a certain point or during a certain period of time, even though the total amount of credit that would otherwise be approved over some extended time, period may not be considered problemsome or a limitation. For example, the total credit approved for a particular credit card account number for a given week at a particular vending machine might typically range between $10 to $20, and not exceed a credit limit established for such credit card account number. At an expected low activity time period during such week, however, such as a time period in the middle of the night, a credit limitation of 5 or 6 successive transactions for a credit card account number that has no previous credit approval history, might be established so as to try to limit the use being made of a credit card. The present system provides control over transaction activity based on the type of products of the vending machine, the machine's location, and the activity levels expected during different times of the day and week, as well as any prior history relating to use of the credit card account numbers at such location.

SUMMARY OF THE INVENTION

The present invention utilizes a system and method for approving and processing credit card transactions in an off-line vending machine or system having an associated card reader and transaction control portion or transaction controller, which transaction control portion typically includes a microprocessor, a real time date/time clock, and memory storage. In general, the system is so constructed or programmed to operate to verify acceptable card types, including, in many instances, by verifying card number check sums, and to also determine that, in order for a credit vend transaction to be authorized, the credit card presented at the card reader is currently valid, i.e., unexpired, and has an authorized credit limit at such vending machine that has not previously been reached. The system may also be so constructed or programmed to be operable to limit the number of transactions that are authorized for a given credit card at a given point of sale location during specified time periods.

In some embodiments, the system may be constructed or programmed to check recorded transactions of a credit card account number in the system to limit the number of authorized transactions to some number based upon authorized transactions occurring during some previous time period. The limitation number can be made to automatically change during expected times of greater activity, expected times of little activity, or expected times of no activity.

The system can additionally provide, in certain embodiments, transaction limitation numbers which automatically vary according to specified times of activity, and are set in the program when the transaction listing is manually uploaded to the system.

In certain embodiments, the system can check a credit card account number against a listing of previously approved card numbers to identify "preferred" customers or account numbers and to allow for an increase in the transaction limitation numbers for such "preferred" customers.

The system can also include, in some embodiments, programming which compares a credit card account number to an off-line list of a "hot" card numbers before allowing a transaction.

The system can also provide in various embodiments for the updating of a "hot" card list and of a known good customer (preferred card) list.

In general, the transaction controller is operable, upon determining that a credit card vend transaction will be authorized, to interact with its associated vending machine or system so as to enable a vend operation thereby and to receive notification therefrom indicating that a vend has subsequently occurred, such as by receiving notification that product delivery was effected.

One embodiment of the system utilizes discrete control/data lines, such as are present with standard single price vending machines and their connectors, to enable vend and to determine vend completion.

Another embodiment of the system accomplishes such interactions by utilizing a multi-drop data bus (MDB).

Following the completion of a vend by the vending machine, the system of the present invention will record the appropriate information for the credit vend transaction, which may typically include the credit card number, the time, and the sale price, for later retrieval, such as by downloading to a hand held data transfer device, when the vending machine or system is thereafter restocked or serviced.

Another embodiment of the present system and method provides for the downloading of the vending machine's activity via a DEX port of the vending machine at the time when the card transaction information is downloaded from the transaction controller.

BRIEF DESCRIPTION OF THE DRAWINGS

FIG. 3 is a listing of representative credit transaction limitation parameters such as might be employed with the present invention.

FIG. 4 is a generalized flow chart depicting in expanded detail certain operations such as might be effected between points A and B in the flow chart of FIG. 2.

FIG. 5 is a generalized flow chart depicting certain operations that might be effected between points A and B in the flow chart of FIG. 2, including the step of comparing the card account number of the proffered credit card to a "hit" card listing for determining credit authorization.

DETAILED DESCRIPTION

Figure 1:
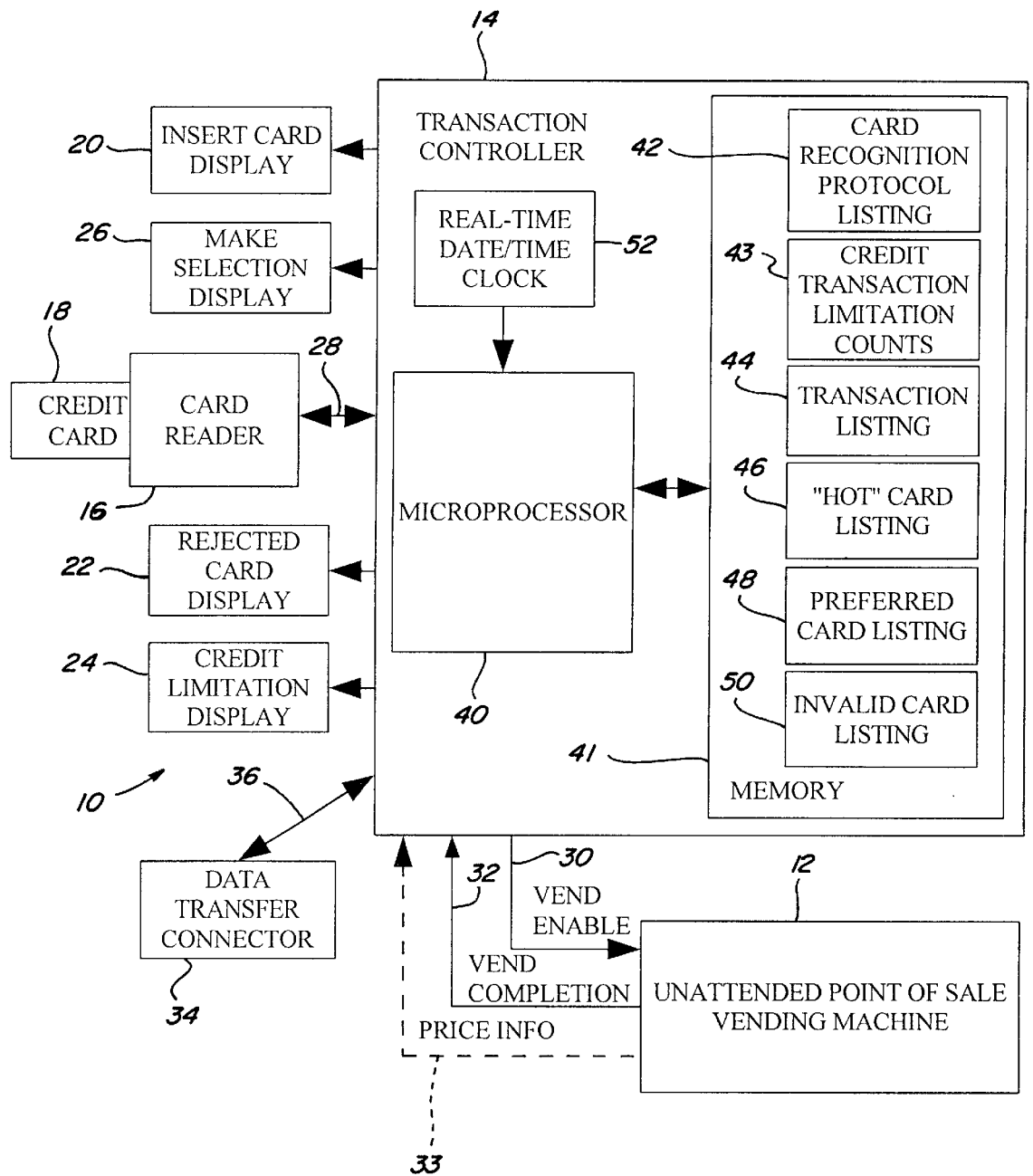
FIG. 1 is a generalized block diagram depicting various components of the system of the present invention and depicting interconnections between a transaction controller, a vending machine, a credit card reader, various customer indicators, and a data transfer connector.

Referring now to the drawings by reference numbers, wherein like numbers refer to like items, FIG. 1 generically depicts a system 10 according to the present invention wherein an off-line vending machine or vending system 12 has associated therewith a transaction controller 14 and a card reader 16 which are operable to receive a credit card 18 entered into the card reader 16 and to take appropriate off-line actions conditioned, at least in part, on the type of card presented and its status. Typically, system information regarding use of a particular card and its status relative to the conduct of a vend transaction may be communicated to a user through various types of displays or user/machine interfaces 20, 22, 24, and 26. For example, transaction controller 14 may be designed to effect display of an insert card message while the system is in an idle or wait mode prior to the insertion of a card 18 into the card reader 16 (or prior to some other transaction initiating event, such as the deposit of a coin into a coin acceptor or the insertion of a bill into a bill validator, if the vending system is configured to support both monies deposit and credit vending). Upon the detection of card insertion into the card reader 16, information regarding the card is communicated via pathway 28 to transaction controller 14 which will then operate to evaluate the card data. If the card is unacceptable for some reason, such as because the card has expired, or because inappropriate check sum figures are computed for the card information, transaction controller 14 can effect generation of a card rejected message 22 to alert the user to the problem. Similarly, if the transaction controller determines that the credit to be extended during the vend transaction is or should be limited in some way, transaction controller 14 may effect the generation of a credit limitation message to alert the user to the existence of the limitation. Card rejection and credit limitation features of the invention will be discussed in further detail hereinafter.

It will be understood and appreciated by those skilled in the art that the card reader employed, as well as card recognition protocols and techniques for recognizing card validity, including check sum operations, are well known and accepted in the art, and all such card readers, protocols, and techniques could be employed in the system and method of the present invention.

If, following insertion of the card 18 into card reader 16, the transaction controller 14 determines that the card is acceptable and that the card will be accepted on at least a limited basis, transaction controller 14 will effect generation of a "make selection" message as well as a vend enable signal 30 to vending machine 12.

The system 10 may thereafter operate according to manners well known in the art to effect the vending of a selected product and to effect the generation of a vend completion signal 32 to the transaction controller 14 upon the completion of a vend operation by vending machine 12.

The system may also include one or more price information data lines 33 over which information regarding the price of the selected product may be communicated from the vending machine 12 to transaction controller 14. If the vending machine 12 is of a single price type, there may be no need for a price data line since all vends will be at the established price for the single price vending machine. On the other hand, if, for example, the vending machine is a 4 or 10 price model, a multi-price model, or a single price model that has been modified to operate at multiple prices (such as will be discussed in further detail hereinafter, the data price line 33 may be employed to provide price information data from the vending machine 12 to the transaction controller 14.

In the case in which only two prices are possible, the presence of a signal or voltage level on the price data line may signify that the selected vend was at a second price, while the absence of a signal or voltage level may signify that the selected vend was at a first, or default, price. For additional prices, serial, analog, or level encoding, multiple price data lines, or a bus, with digital encodings, or combinations thereof, can be employed to provide appropriate price information from the vending machine to the transaction controller.

The system 10 of FIG. 1 also includes an off-line data transfer connector 34 connected via data pathway 36 to the transaction controller 14, a purpose of which is to allow service personnel at the time of servicing of the system to retrieve or enter data, including the stored credit transaction data to be downloaded and any information to be uploaded for use in such system, such as credit card protocol information, credit limitation information, and "hot" card listings.

It will be appreciated that the extension of credit on an off-line basis carries certain risks of non-payment. Accordingly, it has been recognized that it may be advisable to limit the number of credit transactions that will be allowed during particular periods or at certain times. In order to be able to determine card acceptability and the credit to be extended at any times, certain information is provided and/or maintained in tables or listings in memory associated with the transaction controller 14.

Typically, the transaction controller 14 will include a microprocessor 40 and associated memory 41 in which may be stored, among other things, card recognition protocols 42, credit transaction limitation counts 43, and the card transaction listing 44 for the vending machine 12. As will be discussed further hereinafter, certain embodiments may also include and use a "hot" card listing 46, a preferred card listing 48, and/or an invalid card listing 50. By accessing data in the various listings and a real-time date/time clock 52, microprocessor 40 can operate under program control to effect the various operations required of the transaction controller 14.

It will be appreciated that the various messages generated by the transaction controller 14 may take various forms and/or be communicated to the user in various manners. For example, the insert card display message may instruct the user to "Use only Visa or MasterCard" or may simply instruct the user to "Insert Credit Card". Such messages may be presented by way of separate displays, as illustrated in FIG. 1, or through a common alpha-numeric display or even through audio messages, or combinations thereof.

The method of operation 100 of a basic system according to the present invention may be readily explained by reference to FIG. 2, which generally illustrates how the system 10 of FIG. 1 operates. In general, prior to the beginning of a vend transaction according to the present invention, microprocessor 40 may be in an idle, or wait, mode 101 and programmed to continuously or periodically check for or be responsive to an interrupt request occasioned by the occurrence of some initiating event, such as the insertion of a credit card 18 into card reader 16 to initiate a credit vend transaction operation. While in such idle mode, the system may display a card insertion message advising the user to insert a card and/or the types of cards that are considered acceptable.

Upon detection of the insertion of a credit card 18 into the card reader 16, the system will then typically commence a credit vend transaction operation by performing a read credit card operation 102 and by thereafter performing a checking operation 104 to determine whether the card presented is an acceptable type (e.g. Visa or MasterCard, but not Discover or American Express). In making such determination, the microprocessor 40 will typically compare information as provided to it from the card reader 16 against information stored in the card recognition protocol listing 42 to determine whether the proffered credit card is a card of an acceptable type for use in the subject system, and may perform check sum or other operations to verify card authenticity.

If the card is unacceptable for any reason, such as because the presented card is a Discover card and the subject system is programmed to recognize and accept only Visa and/or MasterCards credit cards, the microprocessor will effect operations, consistent with an unrecognized/unacceptable card type, as at operation block 106. Such operations might typically include the display of an appropriate card rejection message indicating that the card is unacceptable and/or instructing the user to insert a correct card type. If check sum or other operations determine that the card is an invalid card for some reason, microprocessor 40 may also effect storage of information regarding such invalid card in the invalid card listing 50 for further use or analysis upon a downloading of such listing, typically at machine servicing. Upon completion of the activities of operation block 106, the system will typically return to the idle mode 101 to await the beginning of another vend transaction operation.

If, during checking operation 104, the card is found to be of an acceptable card type, microprocessor 40 will subsequently operate, as at operation block 108, to determine the then-current time from the real-time clock 52 and will check, as at decision block 110, to determine whether the card has expired or is still valid, i.e., unexpired. If the card has expired, microprocessor 40 will thereafter effect operations, consistent with the detection of card expiration, as at operation block 112, which actions will typically include the presentation of a message to the user, such as by the rejected card display 22, advising that the card has expired and then returning to idle mode 101 to await the beginning of another vend transaction operation.

If the card is found not to be expired during checking operation 110 and to still be valid, microprocessor 40 will thereafter operate to determine the current credit availability for the proffered card, which may typically include determining the credit limits applicable to the proffered credit card. Such determination of applicable credit limitations will typically be based upon information stored in the credit transaction limitation counts listing 43 and may be based, in part, upon information from the real-time date/time clock 52 regarding the then-current date and time and upon information stored in the transaction listing 44. FIG. 3 depicts one possible setup of credit limits such as might be established for the system 10. Upon uploading of data at the time of machine servicing, credit transaction limitation counts for various time periods can be stored in credit transaction limitation counts memory portion 43. Depending upon the particular vending machine employed and its location and other factors, few or many time periods and credit limit values may be employed. The microprocessor 40 can be so programmed to derive from the transaction listing 44 the number or dollar value of credit card vend transactions previously attributed to the proffered credit card during various time periods FIGS. 4 and 5 illustrate two of many possible manners of determining credit availability for the proffered credit card. For example, FIG. 4 depicts one particular manner of determining credit availability, occurring between points A and B in the flow chart of FIG. 2, that includes a determination of long-term credit limits (e.g., 24 hour period) for the account number of the proffered card, as at operation block 121, as well as a determination of short-term credit limits (e.g., lunch period) for the account number of the proffered card, as at operation block 122.

Figure 2:
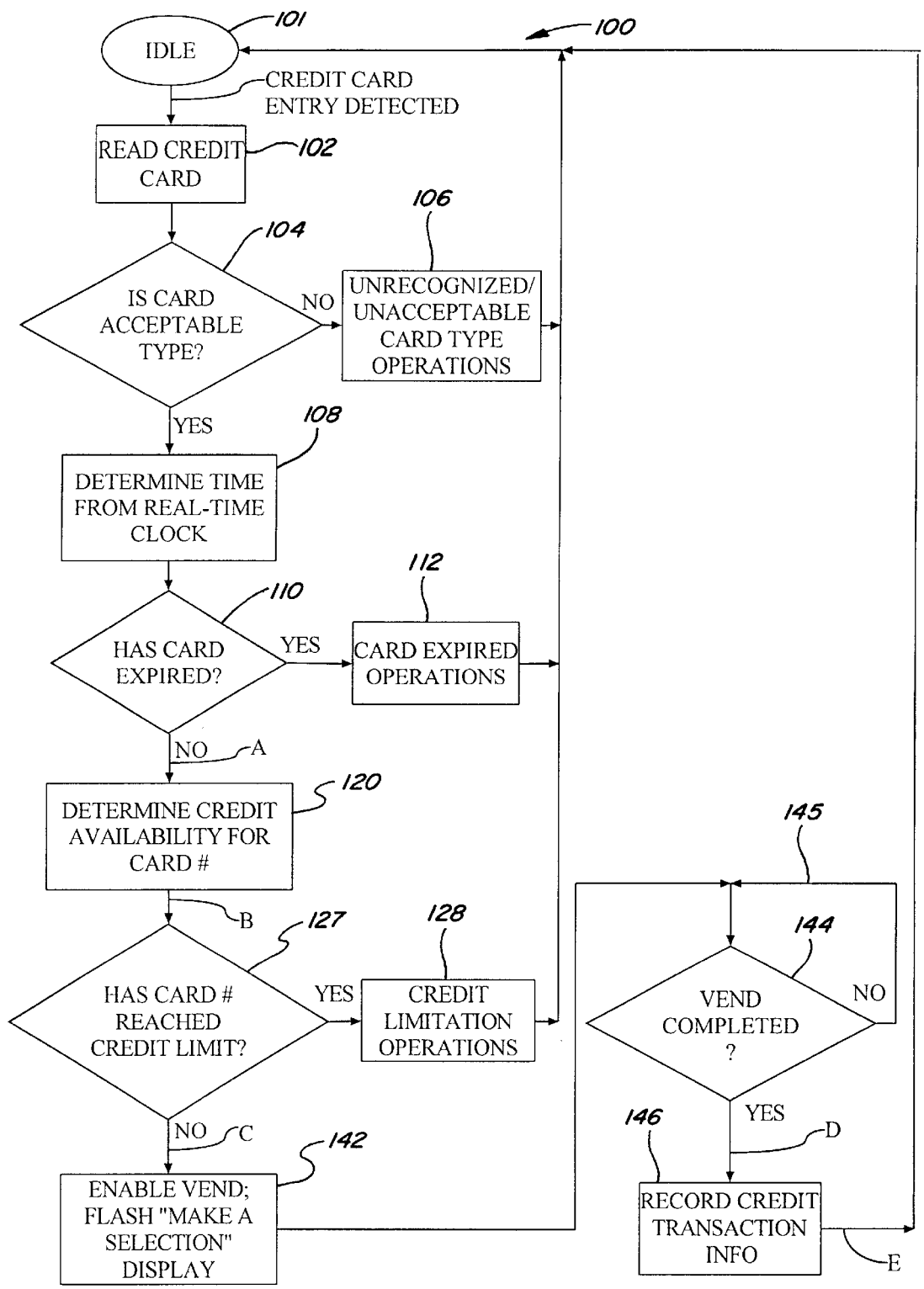
FIG. 2 is a generalized flow chart illustrating one generalized method of operation of the system of the present invention.

FIG. 5 illustrates that, as part of the determination of credit availability for the proffered card, occurring between points A and B in the flow chart of FIG. 2, a comparison of the account number of the proffered card may be made against account numbers stored in the "hot" card listing 46, as at operation block 123. The information in the "hot" card listing will typically be uploaded at the time of servicing to identify card account numbers that are known to be "bad" for some reason, such as because the account has been closed or because the card bearing such account number has been reported as being stolen or lost. If the account number on the proffered card matches a number on the "hot" card listing, as at decision block 124, microprocessor 40 will operate to effect the display of a card rejection message, as at operation block 125, before returning to idle mode 101. If the account number on the proffered card does not match a number on the "hot" card listing, microprocessor 40 will operate to determine the applicable credit limit for such account number, as at operation block 126. As is explained hereinabove with reference to FIG. 4, the determination of credit limits as at operation block 126 may include a determination of different credit limits for different times or could be a generic limit applicable regardless of the time.

If should be understood that, while FIG. 3 illustrates the use of unchanging pre-established credit limits, it would also be possible to generate dynamic credit transaction limitation counts for proffered cards based upon past history of card usage, as reflected in the transaction listing, and the payment history for the card, such as might be included in or form part of the information stored in the preferred card listing 48, which listing will be further discussed hereinafter.

Once the credit availability for the proffered card, with its account number, has been determined, as at operation block 120 of FIG. 2, the credit previously utilized by the card during appropriate time periods is compared to the appropriate determined limits to check whether the proffered credit card, and its account number, have previously reached the determined credit limit, as at decision block 127.

In performing the check at block 127, the microprocessor will typically operate to determine the number of credit vend transactions previously authorized for the proffered card during a preceding time period, such as a 24 hour period, and will then compare such total against the credit transaction limitation count for such period, e.g., 14 authorized credit vends for a standard or first time customer within a 24 hour period (see FIG. 3). If the credit limit for the card has already been reached, the microprocessor 40 will effect operations consistent with recognition of a credit limitation, as at operation block 128, such as by presenting a message to the user advising that the credit limitation for the period has already been reached, before returning to an idle mode of operation 101 to await the beginning of another vend transaction operation.

Figure 6:
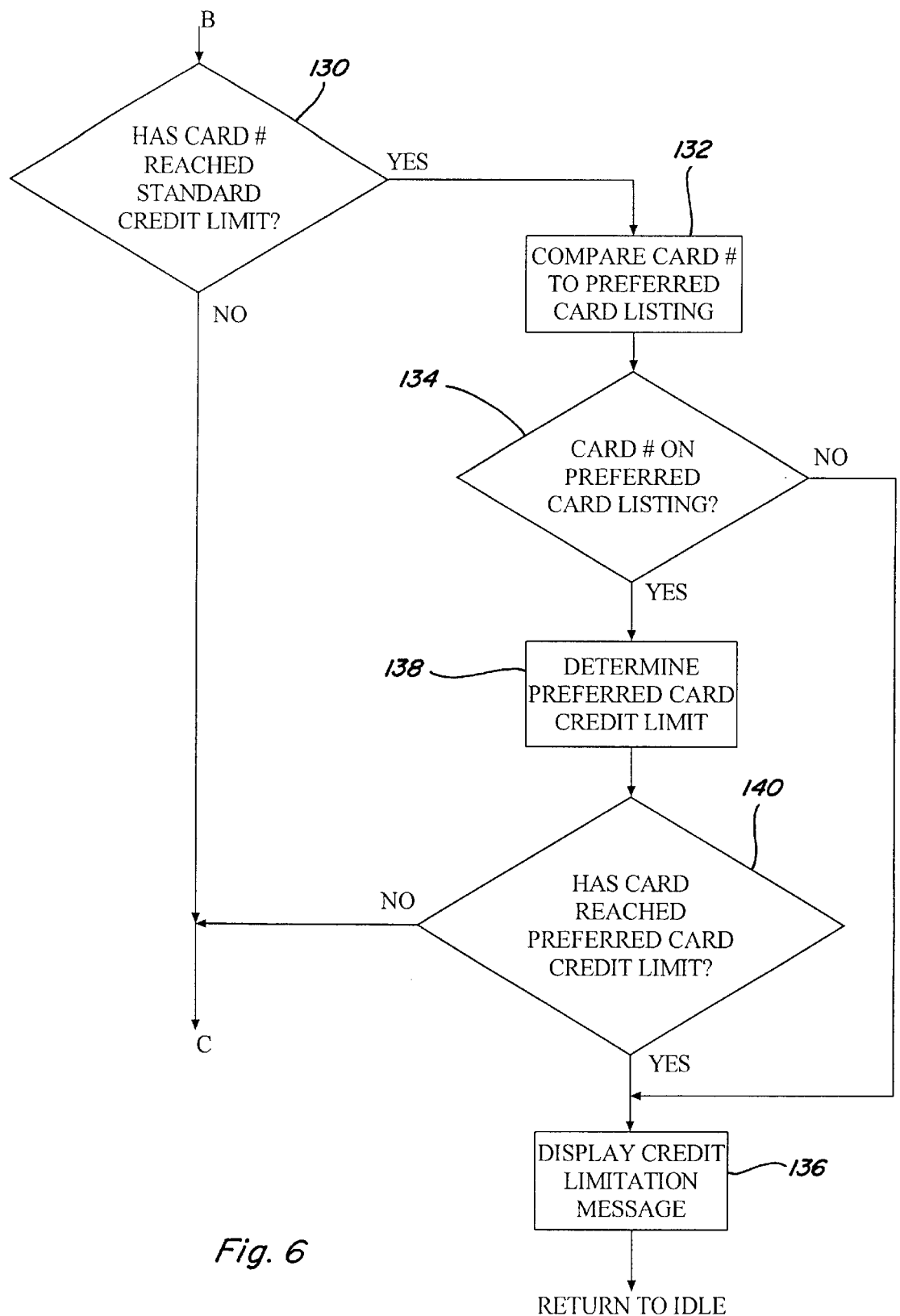
FIG. 6 is a generalized flow chart depicting in expanded detail certain operations that might be effected between points B and C in the flow chart of FIG. 2.

FIG. 6 depicts a particular set of activities such as might typically be associated with the activity blocks 127 and 128 between points B and C in the flow chart of FIG. 2. Under the method of FIG. 6, if the proffered credit card is found at decision block 130 to have already reached its standard credit limit, microprocessor 40 will then operate to compare the account number of the proffered card against a preferred card listing 48, as at operation block 132, and will check at decision block 134 to see if the proffered card's account number is on the preferred card listing 48. If the card number is not in the preferred card listing, microprocessor 40 will proceed to effect the display of a credit limitation message, as at operation block 136, before returning to idle mode 101.

On the other hand, if, at decision block 134, the account number for the proffered card is found in the preferred card listing 48, microprocessor 40 will determine preferred card credit transaction limitation counts as at operation block 138, and will check as at decision block 140 to see whether the credit transaction limitation count for the proffered card, as a preferred card, has been reached.

FIG. 3 illustrates how limitation numbers may differ for a standard customer and for a preferred, or known good, customer. Information for entry into the preferred card listing 48 can be uploaded at the time of machine servicing for storage in such listing.

If, at decision block 140, it is found that the preferred card credit transaction limitation count has already been reached for the proffered card, microprocessor 40 will proceed to perform the actions associated with operation block 136, as previously discussed, before returning to idle mode 101. On the other hand, if the preferred card credit transaction limitation count for the proffered credit card has not previously been reached, microprocessor 40 will instead proceed to point C in the flow chart of FIG. 2.

If, as at point C in the flow chart of FIG. 2, it has been determined that the credit transaction limitation count for the proffered card has not been reached, microprocessor 40 will then operate, as at operation block 142, to enable a vend operation and to present to the user a message advising that he/she may then make a vend selection.

The vending machine or system 12 will thereafter operate, upon the making of a selection by the user, to vend the selected product in accordance with well known practices and principles. As is depicted by decision block 144 and "NO" path 145, microprocessor 40 will await vend completion by the vending machine, such as by detection of a vend completion or product delivery signal communicated from vending machine 12 to transaction controller 14. Upon detection of the product delivery, microprocessor 40 will thereafter operate, as at operation block 146, to record the credit transaction information, which may typically include identification of the card type and account number of the proffered credit card, the time of the transaction, and the sale price, such as in transaction listing 44, before returning to idle state 101 to await the beginning of another vend transaction operation.

Figure 7:
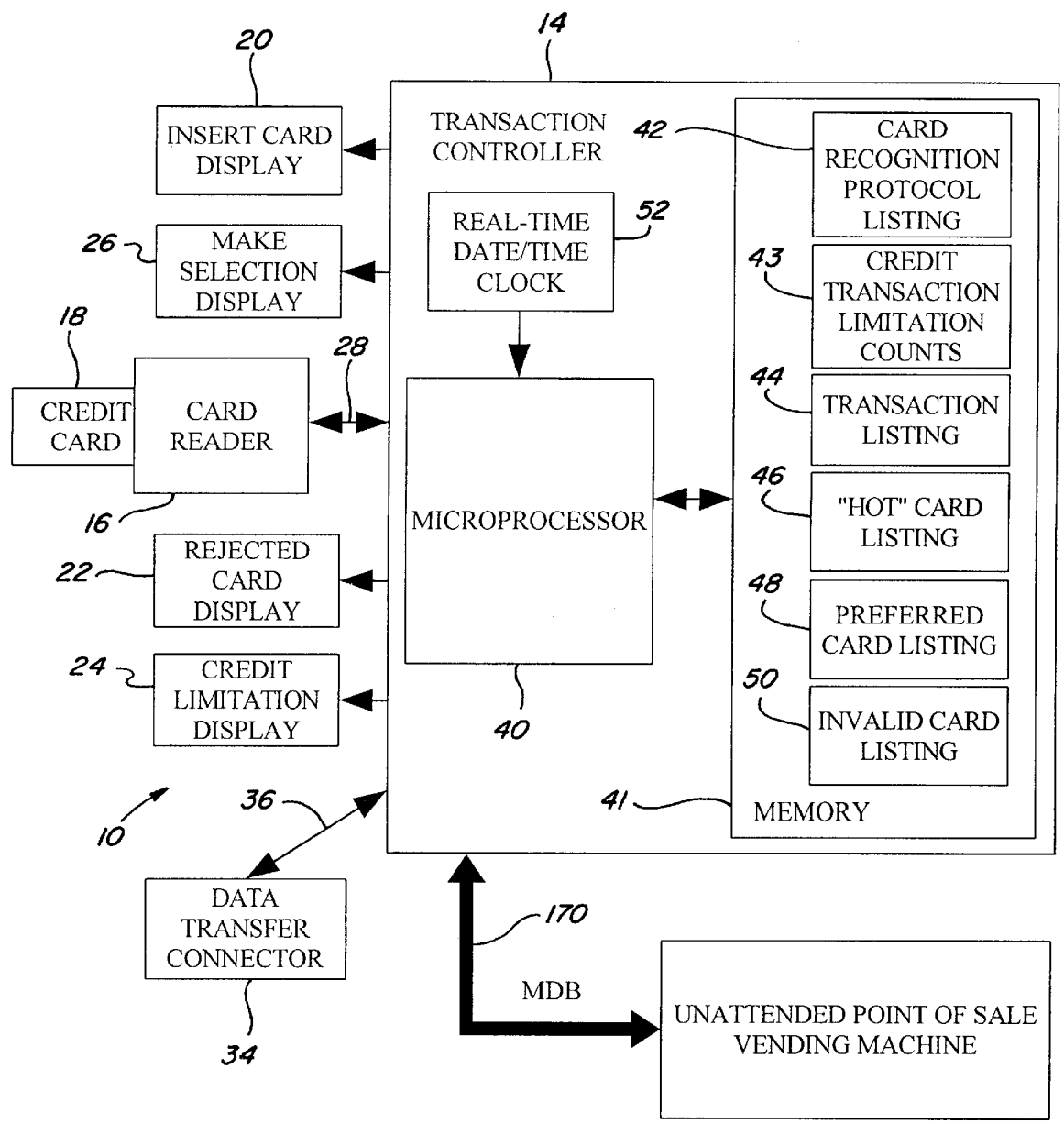
FIG. 7 is a generalized block diagram of the present invention similar to FIG. 1, but depicting the interconnection between the vending machine and the transaction controller as a multi-drop data bus (MDB).

While the system and method of the present invention have been hereinabove described with regard to a vending machine and transaction controller that provide to one another certain control and/or information signals, such as vend enable signals and vend completion or product delivery signals, over discrete lines or leads, it will be appreciated and understood by those skilled in the art that, as depicted in FIG. 7, control signals and data can also be communicated between a vend machine 12' and transaction controller 14' by use of a multi-drop data bus (MDB) 170, as is well known in the vending art and industry. FIG. 7 is similar to FIG. 1, but depicts a system utilizing a multi-drop data bus for communication of control and data information between the vending machine and transaction controller, instead of discrete control and data lines.

Figure 8:
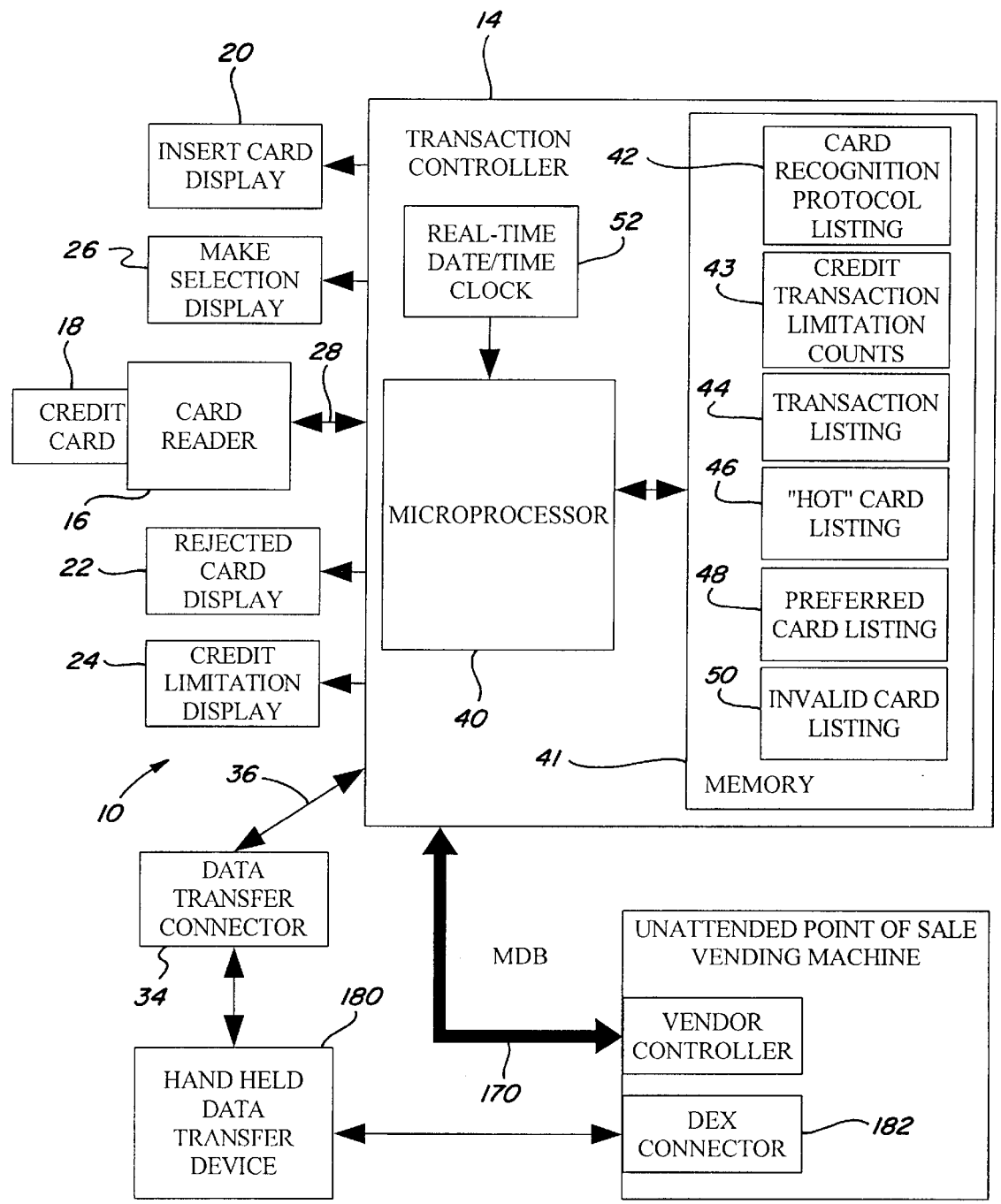
FIG. 8 is a generalized block diagram similar to FIG. 7, but including a depiction of a hand held data transfer device connected to the data transfer connector of the transaction controller and to the DEX connector of the vending machine.

FIG. 8 is similar to FIG. 7, but also includes thereon a depiction of a hand held data transfer device 180 which is connectable to the data transfer connector 34 associated with the transaction controller 14' and with the DEX connector 182 of the vending machine 12.

Figure 9:
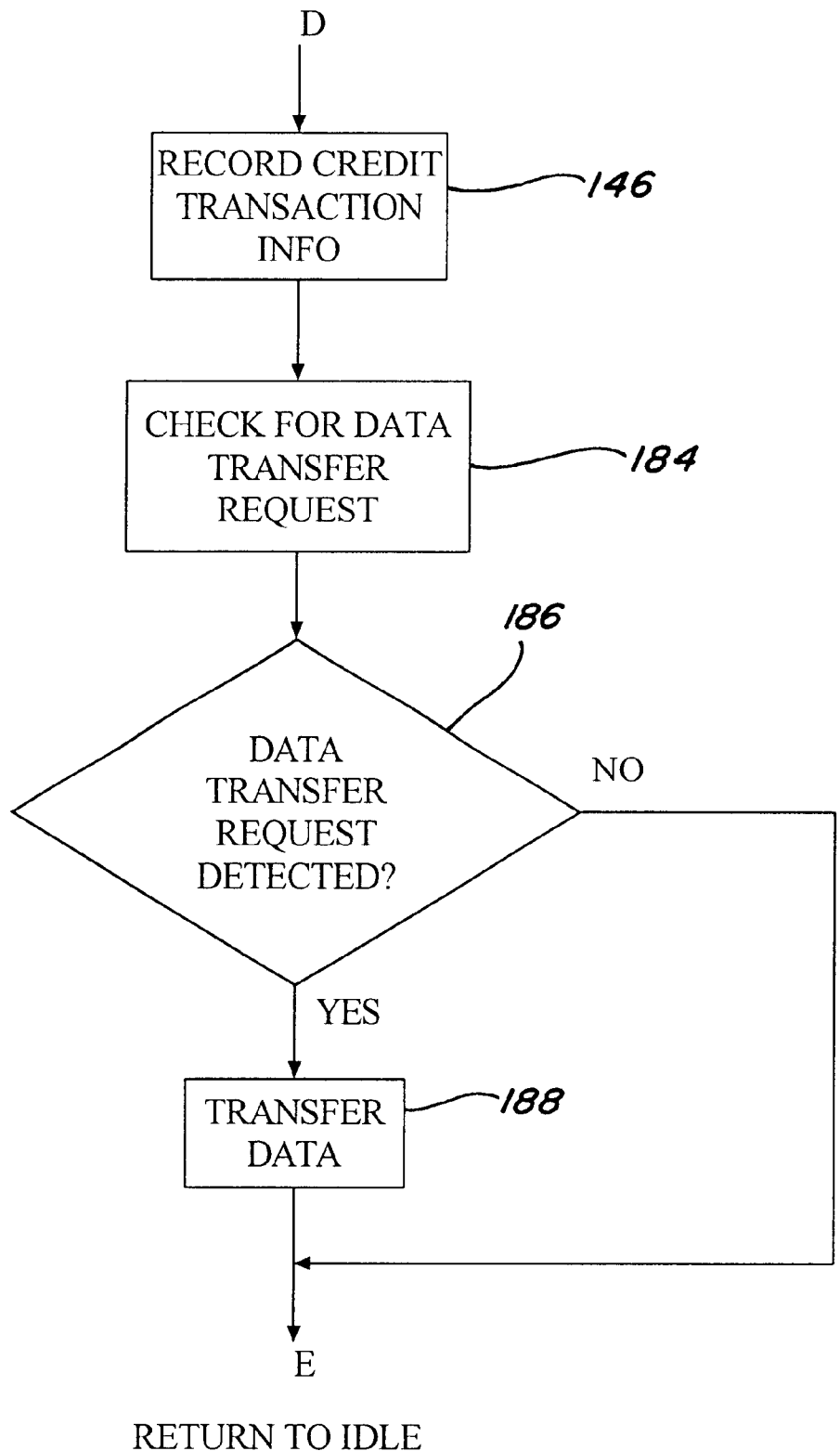
FIG. 9 is a generalized flow chart depicting certain operations that might be effected between points D and E of FIG. 2, including steps relating to manual data transfer.

FIG. 9 depicts a particular method of operation that includes data transfer operations involving the hand held data transfer device 180 of the system of FIG. 8, which method includes additional operation and decision blocks 184–188 such as might be employed following operation block 146 between points D and E in the flow chart of FIG. 2. As illustrated in FIG. 9, following completion of the activities of operation block 146, as previously discussed, microprocessor 40 performs actions consistent with operation block 184 to check for any pending data transfer requests and determines at decision block 144 whether a data transfer request has been detected. If no data transfer request is detected, microprocessor 40 will proceed to idle mode 101 to await the beginning of another vend transaction operation. On the other hand, if a vend transfer request is detected, transaction controller 14'0 will perform actions in accordance with operation block 146 to transmit and receive data, as appropriate.

The use of hand held data transfer devices for the uploading and downloading of information from vending machines, including through DEX connectors, and from microprocessor controlled systems having data transfer connections or infrared or RF communications, and including in response to interrupt requests, such as interrupt requests detected while in an idle or other operation mode, is well known and understood in the vending industry, and any an all appropriate devices and manners of uploading and downloading information may be employed and utilized.

It will be further appreciated and understood that the transaction information and credit authorization information so downloaded through the data connector, such as to a hand held data transfer device, may be subsequently utilized, perhaps after aggregation of transaction information by credit card number, for on-line or other credit charging and billing purposes, according to well-known manners and techniques. Information may be uploaded, such as from the hand held data transfer device, for updating card recognition protocol listings, "hot" card listings, and preferred card listings. The uploading and downloading of such information is well known in the art and particular manners of uploading or downloading are not considered critical to an understanding of the present invention.

It will also be appreciated by those skilled in the art that it is advisable to supply some manner for canceling a transaction in the event of a malfunction of some type or if the user changes his mind prior to some point in the vend transaction sequence, typically before vend delivery is initiated. Many manners and techniques for effecting such cancellations are known and employed by vending machines and systems, and it will be appreciated and understood that many such manners of canceling a transaction could be employed with the present invention.

As has been explained hereinabove, the system and method of the present invention can be used with many machines that use discrete control and data lines for communication with the transaction controller, as well as with vending machines that employ a mutli-drop data bus arrangement. It has also been noted that the present system and method can be employed with both single and multiple price machines, that the price information regarding the selected vend can be provided to the transaction controller either over one or more price information lines or over a bus, and that, especially when such information is supplied over one or more separate price information lines, the information can be provided in serial format or with level or analog encodings or representations.

It has also been found that single price machines employing discrete connections and eight pin Jones plugs, of which there are a large number in the field, can be easily and quickly modified for credit vending at two prices, as will be explained further herebelow.

Figure 10:
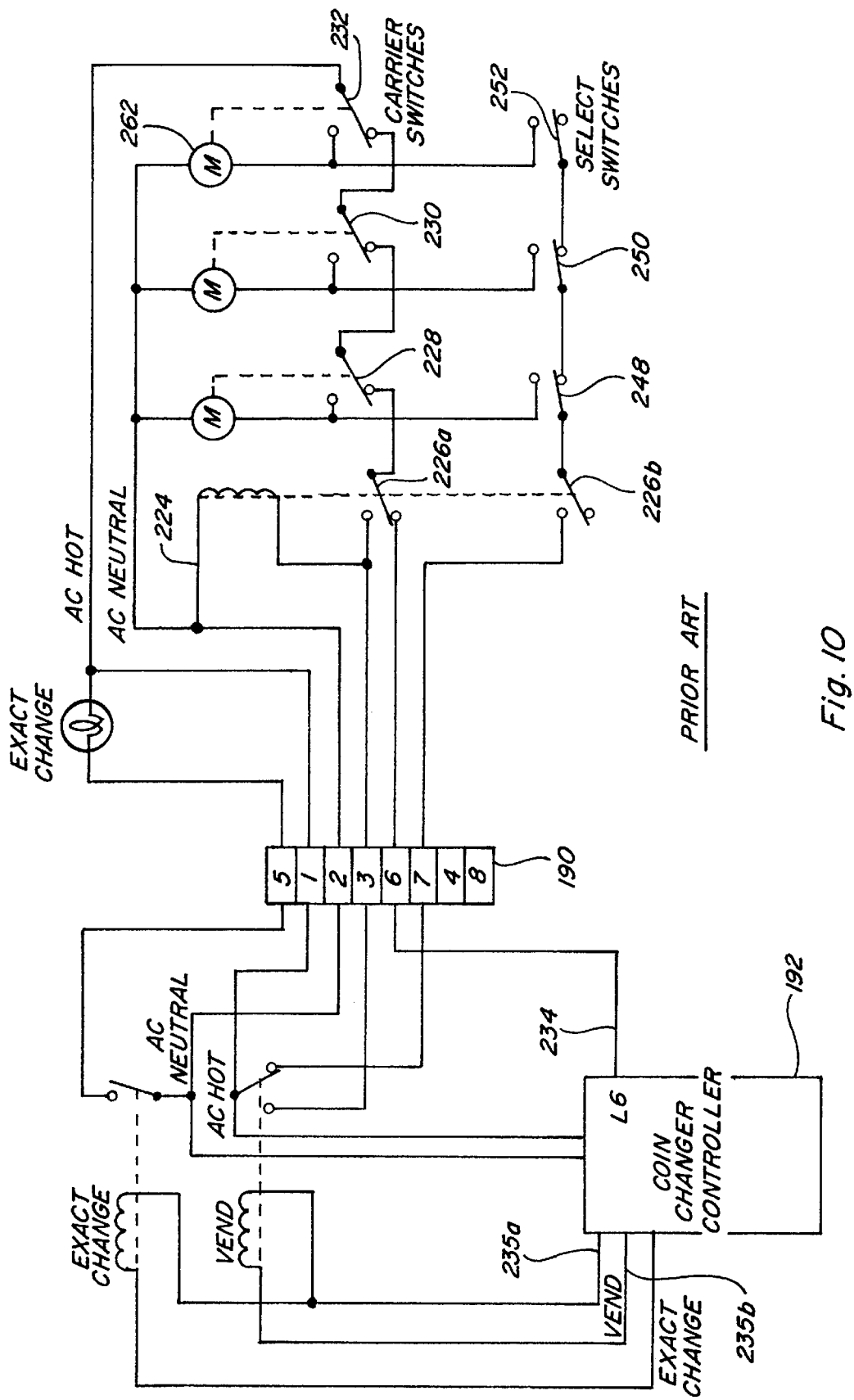
FIG. 10 is a simplified schematic of a prior art, single price vending machine operating under control of a coin changer controller.
Figure 11:
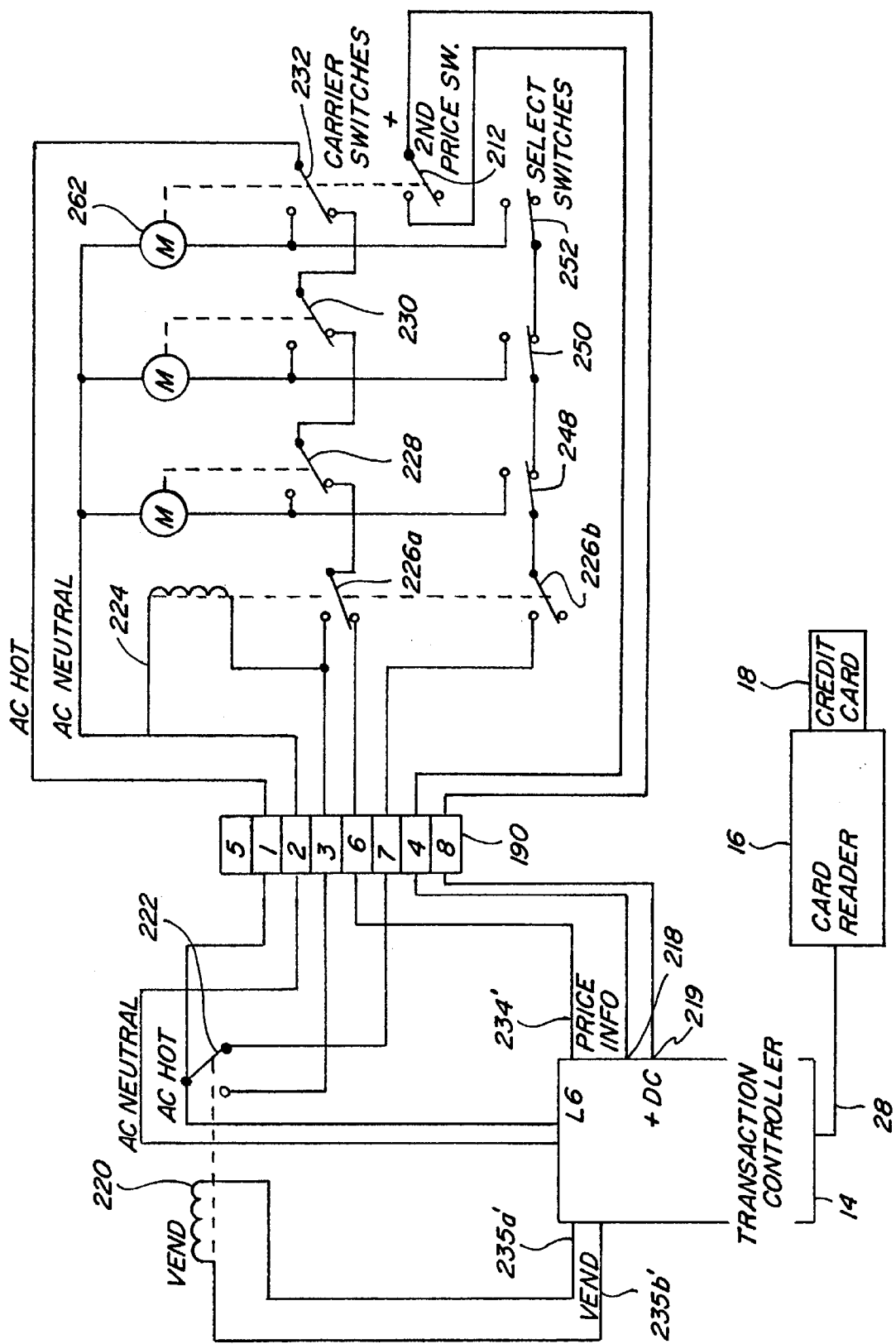
FIG. 11 is a simplified schematic of a construction somewhat similar to FIG. 10, but operating under control of a transaction controller of the system of the present invention, and including a modification to the vending machine to permit vending therefrom at two different prices.

Those knowledgeable in the art will recognize that FIG. 10 is a simplified schematic for a typical single price vending machine employing discrete control and power lines through an eight pin Jones plug 190 for connecting the vending machine to a coin changer controller 192 for controlling vend operations. FIG. 11 is a similar schematic depicting a system according to the present invention in association with a vending machine modified to include a $2^{nd}$ Price Switch 212 associated with and actuated by a vend motor 262 during its operation. The normally open contact of $2^{nd}$ Price Switch 212 is shown connected through pin 4 of the Jones plug 190 to price info input 218 of transaction controller 14, while the common of $2^{nd}$ Price Switch 212 is shown connected through pin 8 of the Jones plug 190 to a +DC port 219 of transaction controller 14.

With reference to FIGS. 10 and 11, it will understood that, prior to the establishment of sufficient credit for a vend, either by way of the deposit of sufficient coins (FIG. 10) or the authorization of credit (FIG. 11), vend relay 220 will be in a de-energized state and the associated vend switch 222 will be in an unactuated state, as shown in FIGS. 10 and 11. Since the circuit between pins 1 and 3 on the left side of the Jones 190 plug is open at such time, credit relay 224 will then be de-energized, as a consequence of which credit switch 226 (including contacts 226a and 226b) will be in its normally open state, as shown. Since motor carrier switches 228, 230, and 232 will also then be in their normally open states, as shown, the AC Hot signal, as supplied to and present at the common of carrier switch 232, will be communicated through such noted switches and pin 6 of the Jones plug 190 to the L6 input 234 of the changer controller 192 (FIG. 10) and to the L6 input 234' of transaction controller 14 (FIG. 11).

For purposes of further discussion relative to the present invention, operation of the exact change relay and its associated switch and the exact change light, as depicted in FIG. 10, need not be considered. It will be readily apparent and understood by those skilled in the art how such components operate in conjunction with the typical single price changers.

When sufficient deposit of coins has been made for a vend with the construction of FIG. 10, or when a credit authorization has been approved for the construction of FIG. 11, the coin changer controller 192 or the transaction controller 14, as appropriate, will produce a voltage across vend outputs 235a–235b of changer controller 192 or vend outputs 235a'–235b' of transaction controller 14. Such voltage will complete a circuit through vend relay 220 sufficient to energize such relay and to cause vend switch 222 to move from its normally unactuated position to an actuated position such that the AC Hot signal at pin 1 of the Jones plug is applied through then-actuated switch 222 and pin 3 of the Jones plug 190 to complete a circuit (to AC Neutral) across credit relay 224, thereby energizing such relay and causing credit switch contacts 226a–226b to be actuated. Actuation of credit switch contact 226a will complete a circuit from AC Hot through the unactuated, cam-operated motor carrier switches 228, 230, and 232, and now-actuated credit switch contact 226a, to maintain a completed circuit across credit relay 224 to maintain such relay energized even when vend switch 222, associated with vend relay 220 returns to its normal unactuated state upon removal of the energizing circuit across vend relay 220, as will be further discussed hereinafter.

Actuation of credit switch contact 226a also acts to open the circuit between AC Hot and pin 6 of the Jones plug 190 (as through motor carrier switches 228–232 and the unactuated vend credit switch contact 226a) to L6 input connector 234 (FIG. 10) and L6 input connection 234' (FIG. 11), in response to which the voltage across vend outputs 235a–235b or 235a–235b' may be removed, thereby resulting in de-energization of vend relay 220 and the resultant return of vend switch 222 to its unactuated state. When vend switch 222 returns to its normal unactuated state, while switch contact 226b is being held actuated, AC Hot is provided through pin 1 of the Jones plug, unactuated vend switch 222, pin 7 of the Jones plug, and actuated switch contact 226b to the normally open, daisy chained, selection switches 248, 250, and 252, which switches are associated, respectively, with vend motors 258, 260, and 262.

When a selection switch 248, 250, or 252 is then actuated by a user, the AC Hot signal present at the common of such switch will be applied to the respective vend motor 258, 260, or 262, to complete a circuit to AC Neutral across such motor thereby causing the respective motor carrier switch 228, 230, or 232 to be actuated as the motor begins to operate, which carrier switch, when so actuated, will maintain a circuit completion across the motor (from AC Hot to the common of the motor carrier switch and through the actuated switch) for the duration of the motor's operation, even when the associated selection switch is released and returns to its unactuated state.

Operation of any of the motor carrier switches 228, 230, or 232 will break the circuit theretofore being maintained to and across credit relay 224, as a consequence of which credit switch contacts 226a and 226b will return to their unactuated states. The opening of switch contact 226b prevents actuation of a second vend motor through actuation of a second selection switch.

As shown in FIG. 11, actuation of vend motor 262 will actuate both motor carrier switch 232 and 2$^{nd}$ Price Switch 214, which switch, like motor carrier switches 228–232, is cam-operated in such embodiment. Actuation of 2$^{nd}$ Price Switch 214 serves to complete a connection between the common of switch 214 and price info input 218, thereby communicating to transaction controller 14 that a second, or different, price should be associated with selection switch 252 and its vend motor 262 than would be the price associated with selection switches 248 or 250 and their respective vend motors 258 or 260.

As the vend motors 258, 260, and 262 complete their cycles of operation, they will cause cam-operated motor carrier switches 228, 230, and 232, as well as cam-operated 2$^{nd}$ Price Switch 214 in the case of vend motor 262, to return to their unactuated states. When such switches return to their unactuated states, the AC Hot signal will again be supplied through unactuated motor carrier switches 228, 230, and 232, unactuated switch contact 226a, and pin 6 of the Jones plug 190, to L6 input 234 of changer controller 192 or L6 input 234' of transaction controller 14. The opening of cam-operated 2$^{nd}$ Price Switch 214 will break the circuit between the common of switch and price info input 218 of transaction controller 14.

From the foregoing, it will thus be appreciated that vending machines that were previously configured for single price vending may be easily modified to facilitate the vending of products at more than one price when associated with the system and method for off-line credit transaction vending as described hereinbefore. In such regard, it should be understood that, while the multi-pricing modification as described hereinabove employs a cam-operated switch as a price information sensor apparatus, other types of sensor mechanisms could also be advantageously utilized, including optical sensors, and that a plurality of sensor mechanisms could be employed and their operations designed and integrated with the production of the vend delivery signal such that a given signal produced by the vend selection and delivery portion may include information both signifying vend delivery or completion and indicating the vend price for the vend selection delivered.

It should be further noted that, while the discussion herein has generally been limited to a discussion of credit vending transactions, the system and method of the present invention could also be employed with vending machines that allow for the deposit of coins and/or currency, in addition to credit authorizations, to establish vend conditions.

It will be appreciated by those skilled in the art that certain of the operations and actions as set forth and described herein may be performed in somewhat different orders, without departing from the spirit of the invention, and that the system could be designed to recognize interrupt requests at certain times, relative to various control signals or requests, instead of having to poll or check certain inputs or data connections.

It will also be understood and appreciated that, while many current card readers include microprocessors programmed to control the operation of the card reader, the transaction controller of the present invention may be so constructed or programmed to be able to control card reader components without the necessity for a separate card reader microprocessor.

Thus, there has been shown and described a novel system and method for processing credit card transactions at an off-line vending machine, which system and method fulfill the various objects and advantages sought therefore. It will be apparent to those skilled in the art, however, that many changes, variations, modification and other uses in applications of the subject system and method are possible, and all such changes, modifications, and other uses in applications which do not depart from the spirit and scope of the invention are deemed to be covered by the invention which is limited only be the claims which follow.

What is claimed is:

1. A method for controlling an off-line credit vend transaction in a credit vending system having a vend selection and delivery portion, an associated credit card reader for receiving credit cards inserted therein and reading card information data therefrom, including information identifying the expiration date and account number of the inserted card, and a transaction controller operatively connected to the credit card reader to receive card information data therefrom and operatively connected to the vend selection and delivery portion of the credit vending system for enabling the operation thereof, the transaction controller including memory storage, including memory for storing credit transaction information, said method comprising the steps of:

a. reading information from a credit card inserted into the card reader and verifying that the card is an acceptable card for use in the credit vending system and has not expired;

b. verifying, while off-line, the current availability at such credit vending system of off-line credit for the account number of the inserted card;

c. enabling selection of a vend by a customer at the vend selection and delivery portion of the credit vending system; and d. storing credit transaction information for such credit vending operation in memory storage of the transaction controller, upon completion of the vend selected by the customer, for subsequent retrieval and credit billing.

2. The method of claim 1 wherein the transaction controller includes memory for storing pre-loaded credit card protocol information and step a includes the activity of comparing the information read from the inserted credit card to credit card protocol information stored in memory storage of the transaction controller.

3. The method of claim 2 wherein the transaction controller includes a real-time date/time clock and step a includes the activity of determining the current date from the real-time date/time clock and comparing such determined current date to the expiration date of the inserted card to verify that the inserted credit card has not expired.

4. The method of claim 3 wherein step a further includes the activity of performing a check sum operation with the information read from the inserted credit card to verify the acceptability of the inserted card.

5. The method of claim 4 wherein the transaction controller includes memory for storing information identifying invalid credit cards detected and step a includes the activity of storing information identifying the inserted card as an invalid card upon failure of the check sum operation.

6. The method of claim 1 wherein the transaction controller includes memory storage for storing pre-loaded credit limitation information and step b includes the activity of determining from the stored credit limitation information and from credit transaction information stored during previous credit vend operations the current availability at such credit vending system of off-line credit for the account number of the inserted card.

7. The method of claim 6 wherein the transaction controller includes a real-time date/time clock, the stored credit limitation information includes information establishing different credit transaction limitation counts for different time periods, and step b includes the activity of determining the current time and date from the real-time date/time clock and utilizing such determined time and date to determine the particular credit transaction limitation count to be utilized for verifying the current availability at such credit vending system of off-line credit for the inserted credit card.

8. The method of claim 7 wherein step b includes the activity of determining the current availability at such credit vending system of off-line credit for the account number of the inserted card by utilizing credit transaction limitation counts for at least two time periods, one of which periods is a shorter time period at least a portion of which is included within the longer time period.

9. The method of claim 6 wherein the pre-loaded credit limitation information is employed in conjunction with stored credit transaction information for the account number of the inserted card to calculate a dynamic credit transaction limitation count to be utilized for such particular inserted card for verifying the current availability at such credit vending system of off-line credit for such particular inserted card.

10. The method of claim 6 wherein the transaction controller includes memory storage for storing pre-loaded "hot" card information and step b includes the activity of verifying that the account number of the inserted card is not included in the stored "hot" card information.

11. The method of claim 6 wherein the transaction controller includes memory storage for storing pre-loaded preferred card information and step b includes the activity of determining whether the account number of the inserted card is included in the stored preferred card information and, if so, utilizing a higher credit transaction limitation count than if the account number is not included in the stored preferred card information.

12. The method of claim 1 wherein the credit vending system includes a first connection between the transaction controller and the vend selection and delivery portion for communicating a vend enable signal from the transaction controller to the vend selection and delivery portion and a second connection between the vend selection and delivery portion and the transaction controller for communicating a vend completion signal from the vend selection and delivery portion to the transaction controller, and wherein step c includes the generation of a vend enable signal by the transaction controller and step d includes the production of a vend completion signal by the vend selection and delivery portion.

13. The method of claim 12 wherein the vending control system includes means for communicating from the vend selection and control portion to the transaction controller price information regarding the particular vend selected by the user and wherein the credit transaction information stored in step d includes such price information.

14. The method of claim 1 wherein the vending control system includes a data bus between the transaction controller and the vend selection and delivery portion for communicating vend enable data from the transaction controller to the vend selection and delivery portion and vend completion data from the vend selection and delivery portion to the transaction controller, and wherein step c includes the application by the transaction controller of data on the data bus signifying a vend enable condition and step d includes the application by the vend selection and delivery portion of data on the data bus signifying a vend completion condition.

15. The method of claim 14 wherein step d includes the activity of determining the price information for the selected vend from price information data applied to the data bus by the vend selection and delivery portion, the credit transaction information being stored including such determined price information.

16. The method of claim 14 wherein the credit vending system includes means for communicating price information regarding the particular vend selected by the user from the vend selection and delivery portion to the transaction controller and wherein the credit transaction information stored in step d includes such price information.

17. The method of claim 1 wherein the credit vending system includes a data transfer connector associated with the transaction controller, to which data transfer connector a portable data transfer device may be operatively connected by service personnel, and wherein the method further includes the activity of determining whether a portable data transfer device is connected to the data transfer connector and a data transfer is requested and, if so, downloading the credit transaction information stored in the memory storage of the transaction controller to the portable data transfer device.

18. The method of claim 17 wherein the memory storage includes memory for storing information identifying invalid credit cards detected during credit vend operations and wherein, upon determination of a data transfer request, the invalid card information stored in the memory storage of the transaction controller is also downloaded to the portable data transfer device.

19. The method of claim 17 wherein, upon determination of a data transfer request, "hot" card information is uploaded from the portable data transfer device to memory storage of the transaction controller.

20. The method of claim 17 wherein, upon determination of a data transfer request, information to establish credit transaction limitation counts is uploaded from the portable data transfer device to memory storage of the transaction controller.

21. The method of claim 17 wherein the memory storage includes memory for storing established credit transaction limitation counts and wherein, upon determination of a data transfer request, information to update the established credit transaction limitation counts stored in the memory storage of the transaction controller is uploaded from the portable data transfer device to the transaction controller.

22. The method of claim 17 wherein, upon determination of a data transfer request, information to identify the account numbers of preferred credit cards is uploaded from the portable data transfer device to memory storage of the transaction controller.

23. The method of claim 17 wherein the credit vending system includes a DEX port associated with the vend selection and delivery control portion, to which DEX port the portable data transfer device may be operatively connected by service personnel, and wherein the method further includes the activity of transferring vend selection and delivery information between the vend selection and delivery portion and the portable data transfer device when the portable data transfer device is operatively connected to the DEX port.

24. The method of claim 23 wherein the transfer of said vend selection and delivery information occurs concurrently with the downloading of the credit transaction information.

25. The method of claim 1 wherein the information read from the inserted card also includes information identifying the credit card issuer.

26. A credit vending system for controlling an off-line credit vend transaction comprising a vending system including a vend selection and delivery portion, an associated credit card reader for receiving credit cards inserted therein and for reading card information data from the inserted card, including information identifying the expiration date and account number of the inserted card, and a transaction controller operatively connected to the credit card reader to receive card information data therefrom and operatively connected to the vend selection and delivery portion for enabling the operation thereof, said transaction controller including memory storage, including memory for storing credit transaction information, said transaction controller responsive to information read from the inserted card by said credit card reader upon insertion of a credit card therein to verify that the inserted card is an acceptable card for use in the credit vending system and has not expired, said transaction controller thereafter operable to verify, while off-line, the current availability at said credit vending system of off-line credit for the account number of the inserted card and, upon such verification of currently available credit, to enable vend selection by a customer at the vend selection and delivery portion of the vending system, said vend selection and delivery portion responsive to selection of a vend by a customer to effect vend delivery and, upon vend completion, to communicate notice thereof to said transaction controller, said transaction controller responsive to said vend completion notice to store credit transaction information for such off-line credit vending operation in memory storage of the transaction controller for subsequent retrieval and credit billing.

27. The system of claim 26 wherein said transaction controller includes memory for storing pre-loaded credit card protocol information and is operable, in verifying that the card is an acceptable card for use in the credit vending system, to compare information read from the inserted credit card to credit card protocol information stored in memory storage of the transaction controller.

28. The system of claim 27 wherein said transaction controller includes a real-time date/time clock and is operable, in verifying that the card inserted into the card reader has not expired, to determine the current date from the real-time date/time clock and to compare such determined current date to the expiration date of the inserted card.

29. The system of claim 28 wherein said transaction controller is further operable, in verifying that the card is an acceptable card for use in the credit vending system, to perform a check sum operation with information read from the inserted card.

30. The system of claim 29 wherein said transaction controller includes memory for storing information identifying invalid credit cards detected and is operable to store information identifying the inserted card as an invalid card upon failure of the check sum operation.

31. The system of claim 26 wherein said transaction controller includes memory storage for storing pre-loaded credit limitation information and is operable, in verifying the current availability at said credit vending system of off-line credit for the inserted card, to determine from the stored credit limitation information and from credit transaction information stored during previous credit vend operations a credit transaction limitation count for the inserted card and whether the aggregated credit previously extended for the inserted card has reached the determined credit transaction limitation count for the inserted card.

32. The system of claim 31 wherein said transaction controller includes a real-time date/time clock, the stored credit limitation information includes information establishing different credit transaction limitation counts for different time periods, and said transaction controller is operable, in verifying the current availability at said credit vending system of off-line credit for the inserted card, to determine the current time and date from the real-time date/time clock and to utilize such determined time and date to determine a particular credit transaction limitation count associated with a time period for such determined time and date.

33. The system of claim 32 wherein a plurality of credit transaction limitation counts, for a plurality of different, at least partially overlapping, time periods, are associated with a given time and date as determinable from said real-time date/time transaction controller and said transaction controller is further operable, in verifying the current availability at said credit vending system of off-line credit for the inserted card, to utilize said plurality of stored credit transaction limitation counts for determining the off-line credit availability for the various different time periods associated with said determined time and date.

34. The system of claim 31 wherein the pre-loaded credit limitation information is employed in conjunction with stored credit transaction information for the account number of the inserted card to calculate a dynamic credit transaction limitation count to be utilized for such particular inserted card for verifying the current availability at said credit vending system of off-line credit for such particular inserted card.

35. The system of claim 31 wherein said transaction controller includes memory storage for storing pre-loaded "hot" card information and is operable, in verifying the current availability at said credit vending system of off-line credit for the inserted card, to determine that the account number of the inserted card is not included in the stored "hot" card information.

36. The system of claim 31 wherein said transaction controller includes memory storage for storing pre-loaded preferred card information and is operable, in verifying the current availability at said credit vending system of off-line credit for the inserted card, to determine whether the account number of the inserted card is included in the stored preferred card information and, if so, to utilize a higher credit transaction limitation count than if the account number is not included in the stored preferred card information.

37. The system of claim 26 further including a first connection between said transaction controller and said vend selection and delivery portion for communicating a vend enable signal from said transaction controller to said vend selection and delivery portion and a second connection between said vend selection and delivery portion and said transaction controller for communicating a vend completion signal from said vend selection and delivery portion to said transaction controller, wherein said transaction controller is operable, upon determining the current availability at said credit vending system of off-line credit for the inserted credit card, to produce a vend enable signal on said first connection and said vend selection and delivery portion is operable, upon completion of a vend, to produce a vend completion signal on said second connection.

38. The system of claim 37 further including means for communicating from said vend selection and control portion to said transaction controller price information regarding the particular vend selected by the user, said vend selection and delivery portion operable to generate said price information when vend selection is enabled and a vend selection is made by a user.

39. The system of claim 38 wherein said vend selection and delivery portion includes a plurality of vend delivery devices for effecting the delivery of respective associated vend selections, a first set of which vend selections has a first vend price associated therewith and a second set of which vend selections has a second vend price associated therewith, each of said sets including at least one vend selection, and a price information switch associated with the vend delivery devices for said second set of vend selections, said price information switch actuatable upon operation of a vend delivery device associated with said second set of vend selections to provide different price information than the price information provided when said price information switch is not actuated.

40. The system of claim 26 further including a data bus between said transaction controller and said vend selection and delivery portion for communicating vend enable data from said transaction controller to said vend selection and delivery portion and vend completion data from said vend selection and delivery portion to said transaction controller, wherein said transaction controller is operable, upon determining the current availability at said credit vending system of off-line credit for the inserted credit card, to produce data on the data bus signifying a vend enable condition and said vend selection and delivery portion is operable, upon completion of a vend, to produce data on the data bus signifying a vend completion condition.

41. The system of claim 40 wherein said vend selection and delivery portion is operable to produce data on said data bus indicative of the vend price for the selected vend.

42. The system of claim 40 further including means for communicating to said transaction controller price information regarding the particular vend selected by the user, said vend selection and delivery portion operable to generate said price information when vend selection is enabled and a vend selection is made by a user.

43. The system of claim 26 further including a data transfer connector associated with said transaction controller, to which data transfer connector a portable data transfer device may be operatively connected by service personnel for providing a data transfer request to said transaction controller, said transaction controller operable to determine whether a portable data transfer device is connected to the data transfer connector and a data transfer is requested and, if so, to download said credit transaction information stored in the memory storage of the transaction controller to the portable data transfer device.

44. The system of claim 43 wherein said memory storage includes memory for storing information identifying invalid cards detected during credit vend operations, said transaction controller operable, upon determining that a data transfer has been requested, to also download to the portable data transfer device invalid card information stored in the memory storage of the transaction controller.

45. The system of claim 43 wherein said transaction controller is operable, upon determining that a data transfer has been requested, to also upload "hot" card information from the portable data transfer device to memory storage of said transaction controller.

46. The system of claim 43 wherein said transaction controller is operable, upon determining that a data transfer has been requested, to also upload from the portable data transfer device to memory storage of the transaction controller information to establish credit transaction limitation counts.

47. The system of claim 43 wherein said memory storage includes memory for storing established credit transaction limitation counts, said transaction controller operable, upon determining that a data transfer has been requested, to also upload from the portable data transfer device to said transaction controller information to update the established credit transaction limitation counts stored in the memory storage of said transaction controller.

48. The system of claim 43 wherein said transaction controller is operable, upon determining that a data transfer has been requested, to also upload from the portable data transfer device to memory storage of said transaction controller information to identify the account numbers of preferred credit cards.

49. The system of claim 43 wherein said vend selection and delivery control portion includes a vend controller and a DEX port associated therewith, to which DEX port the portable data transfer device may be operatively connected by service personnel to provide a data transfer request to said vend controller, said vend controller operable, upon determining that a data transfer has been requested, to effect the transfer of vend selection and delivery information between said vend selection and delivery portion and the portable data transfer device.

50. The system of claim 49 wherein the transfer of said vend selection and delivery information occurs concurrently with the downloading of credit transaction information.

51. The system of claim 26 wherein the information read from the inserted card includes information identifying the credit card issuer.

52. The system of claim 26 wherein said transaction controller includes a microprocessor programmed to control the operation of said transaction controller.

53. The system of claim 52 wherein said microprocessor is also programmed to control the operation of said credit card reader.

54. In a vending system having a vend selection and delivery portion which includes a vend selection portion operable by a user to select a desired vend selection from among a plurality of possible vend selections and a plurality of vend delivery devices for effecting delivery of respective associated vend selections, said vend selection and delivery portion configured for single price vending of a plurality of possible vending selections and being operatively connectable to a vend enabling controller to receive a signal provided to said vend selection and delivery portion to enable said vend selection and delivery portion to recognize and respond to a desired vend selection by a user to effect vend delivery of such desired vend selection at such single price and to provide a signal to the vend enabling controller upon vending of the desired vend selection indicative of vend delivery, and wherein said vend selection and delivery portion as operatively connectable in a vending system to a vend enabling controller is operatively connectable to a credit transaction controller of a credit vending system, which credit transaction controller is associated with a credit information entry portion at which a user may enter information to establish a credit situation, is operable to provide an enabling signal to the vend selection and delivery portion upon determining that the information entered by the user is sufficient to establish the existence of a credit situation for the user, and is operable in response to a vend delivery signal to store credit transaction information, the improvement comprising a multi-pricing modification to the single-price configured vend selection and delivery portion, said multi-pricing modification including a price information sensor apparatus associated with the vend delivery devices, wherein a first set of vend selections has a first vend price associated therewith and a second set of vend selections has a second vend price associated therewith, each of which sets includes at least one vend selection, said price information sensor apparatus operatively connectable to the credit transaction controller to provide thereto, upon operation of a vend delivery device associated with the second set of vend selections, price information that is different from the price information that is provided upon operation of a vend delivery device associated with a vend delivery associated with the first set of vend selections.

55. The improvement of claim 54 wherein the vend selection portion includes a plurality of selection switches operable to select and identify a desired vend.

56. The improvement of claim 55 wherein each of said selection switches is associated with a respective vend delivery device.

57. The improvement of claim 55 wherein said selection switches are operable to establish a condition indicative of a desired vend selection associated with a given vend delivery device.

58. The improvement of claim 54 wherein the vend selection portion includes a keypad for entering vend selection information identifying a desired vend.

59. The improvement of claim 54 wherein said vend delivery devices are vend motors.

60. The improvement of claim 59 wherein said price information sensor apparatus includes a cam-operated switch under control of a vend motor associated with said second set of vend selections.

61. The improvement of claim 60 wherein said cam-operated switch includes a common operatively connectable to a signal source and a normally open contact operatively connectable to the credit transaction controller, actuation of said cam-operated switch under control of an associated vend motor completing a circuit from the common to the normally open contact of said cam-operated switch, said circuit completion being detectable by the credit transaction controller.

62. The improvement of claim 59 wherein said price information sensor apparatus includes a plurality of cam-operated switches each under control of a respective vend motor associated with said second set of vend selections.

63. The improvement of claim 62 wherein operation of any of said cam-operated switches effects the production by said price information sensor apparatus of price information that is different from the price information that is provided upon operation of a vend motor associated with a vend delivery associated with the first set of vend selections.

64. The improvement of claim 63 wherein the vend selections associated with at least some of the cam-operated switches have different vend prices, each of which cam-operated switches associated with a different vend price is connected in circuit to provide a different signal to the credit transaction controller when operated under control of its associated vend motor.

65. The improvement in claim 59 wherein said price information sensor apparatus includes an optical sensor associated with said second set of vend selections.

66. The improvement of claim 54 wherein said vend delivery devices include vend delivery relays.

67. The improvement of claim 66 wherein the vend selection and delivery portion includes a vend motor associated with the vend delivery relays and operable in conjunction with said vend delivery relays to effect the delivery of the vend selections associated with respective vend delivery relays.

68. The improvement of claim 54 wherein said price information sensor apparatus includes a first sensor mechanism associated with the first set of vend selections and their associated vend delivery devices and a second sensor mechanism associated with the second set of vend selections and their associated vend delivery devices, each of said sensor mechanisms operable to detect vend delivery of a vend selection associated therewith, said price information sensor apparatus providing a signal to the credit transaction controller indicative of a vend at a first vend price when said first sensor mechanism detects the vend of a vend selection having a first vend price and a signal indicative of a vend at a second vend price when said second sensor mechanism detects the vend of a vend selection having a second vend price.

69. The improvement of claim 68 wherein said sensor mechanisms are optical sensors.

70. The improvement of claim 54 wherein the price information provided to the credit transaction controller is included within the vend delivery signal produced by vend selection and delivery portion and provided to the credit transaction controller.

* * * * *

UNITED STATES PATENT AND TRADEMARK OFFICE
CERTIFICATE OF CORRECTION

PATENT NO.    : 6,427,912 B1
DATED         : August 6, 2002
INVENTOR(S)   : Joseph L. Levasseur It is certified that error appears in the above-identified patent and that said Letters Patent is hereby corrected as shown below:

Column 9,
Line 25, "12" should be -- 12' --.
Line 41, "14'0" should be -- 14' --.

Signed and Sealed this

Twenty-first Day of January, 2003

JAMES E. ROGAN
*Director of the United States Patent and Trademark Office*